US008977672B2

(12) United States Patent
Karandikar

(10) Patent No.: US 8,977,672 B2
(45) Date of Patent: Mar. 10, 2015

(54) INTELLIGENT SCHEDULING FOR REMOTE COMPUTERS

(75) Inventor: Amey Vijaykumar Karandikar, Long Branch, NJ (US)

(73) Assignee: CommVault Systems, Inc., Tinton Falls, NJ (US)

( * ) Notice: Subject to any disclaimer, the term of this patent is extended or adjusted under 35 U.S.C. 154(b) by 180 days.

(21) Appl. No.: 13/492,445

(22) Filed: Jun. 8, 2012

(65) Prior Publication Data

US 2013/0332505 A1    Dec. 12, 2013

(51) Int. Cl.
*G06F 15/16* (2006.01)
*G06F 9/50* (2006.01)
*H04L 29/08* (2006.01)

(52) U.S. Cl.
CPC .......... *G06F 9/5083* (2013.01); *H04L 67/1002* (2013.01)
USPC ....................................................... 709/202

(58) Field of Classification Search
CPC ..................................................... G06F 15/16
USPC .................... 709/202, 203, 218, 219
See application file for complete search history.

(56) References Cited

U.S. PATENT DOCUMENTS

| | | | |
|---|---|---|---|
| 4,084,231 A | 4/1978 | Capozzi et al. |
| 4,267,568 A | 5/1981 | Dechant et al. |
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |

(Continued)

FOREIGN PATENT DOCUMENTS

| | | |
|---|---|---|
| AU | 2004227949 | 10/2004 |
| CA | 2498174 | 3/2004 |

(Continued)

OTHER PUBLICATIONS iPhone User's Guide (Apple, Feb. 10, 2012).*

(Continued)

*Primary Examiner* — Vivek Srivastava
*Assistant Examiner* — Nicholas Celani
(74) *Attorney, Agent, or Firm* — Knobbe, Martens, Olson & Bear, LLP

(57) ABSTRACT

A method of protecting data on a mobile computing device using a storage network by deploying to the mobile computing device, a synchronization agent and then associating a synchronization policy with the synchronization agent. The mobile computing device is monitored for at least one threshold event. Its determined that the threshold event has occurred which causes a request to initiate a data synchronization event to be transmitted. The response to the request is synchronizing the mobile computing device with the storage network.

14 Claims, 8 Drawing Sheets

(56) References Cited

U.S. PATENT DOCUMENTS

| | | | |
|---|---|---|---|
| 5,241,670 | A | 8/1993 | Eastridge et al. |
| 5,276,860 | A | 1/1994 | Fortier et al. |
| 5,276,867 | A | 1/1994 | Kenley et al. |
| 5,287,500 | A | 2/1994 | Stoppani, Jr. |
| 5,301,286 | A | 4/1994 | Rajani |
| 5,321,816 | A | 6/1994 | Rogan et al. |
| 5,347,653 | A | 9/1994 | Flynn et al. |
| 5,410,700 | A | 4/1995 | Fecteau et al. |
| 5,420,996 | A | 5/1995 | Aoyagi |
| 5,454,099 | A | 9/1995 | Myers et al. |
| 5,559,991 | A | 9/1996 | Kanfi |
| 5,642,496 | A | 6/1997 | Kanfi |
| 6,418,478 | B1 | 7/2002 | Ignatius et al. |
| 6,542,972 | B2 | 4/2003 | Ignatius et al. |
| 6,658,436 | B2 | 12/2003 | Oshinsky et al. |
| 6,721,767 | B2 | 4/2004 | De Meno et al. |
| 6,760,723 | B2 | 7/2004 | Oshinsky et al. |
| 7,003,641 | B2 | 2/2006 | Prahlad et al. |
| 7,035,880 | B1* | 4/2006 | Crescenti et al. ............ 1/1 |
| 7,130,970 | B2 | 10/2006 | Devassy et al. |
| 7,162,496 | B2 | 1/2007 | Amarendran et al. |
| 7,174,433 | B2 | 2/2007 | Kottomtharayil et al. |
| 7,209,972 | B1 | 4/2007 | Ignatius et al. |
| 7,246,207 | B2 | 7/2007 | Kottomtharayil et al. |
| 7,315,923 | B2 | 1/2008 | Retnamma et al. |
| 7,315,924 | B2 | 1/2008 | Prahlad et al. |
| 7,343,453 | B2 | 3/2008 | Prahlad et al. |
| 7,380,072 | B2 | 5/2008 | Kottomtharayil et al. |
| 7,389,311 | B1* | 6/2008 | Crescenti et al. ............ 1/1 |
| 7,395,282 | B1 | 7/2008 | Crescenti et al. |
| 7,401,154 | B2 | 7/2008 | Ignatius et al. |
| 7,409,509 | B2 | 8/2008 | Devassy et al. |
| 7,440,982 | B2 | 10/2008 | Lu et al. |
| 7,447,692 | B2 | 11/2008 | Oshinsky et al. |
| 7,454,569 | B2* | 11/2008 | Kavuri et al. ............ 711/117 |
| 7,484,054 | B2 | 1/2009 | Kottomtharayil et al. |
| 7,490,207 | B2 | 2/2009 | Amarendran et al. |
| 7,500,053 | B1 | 3/2009 | Kavuri et al. |
| 7,529,782 | B2 | 5/2009 | Prahlad et al. |
| 7,536,291 | B1 | 5/2009 | Vijayan Retnamma et al. |
| 7,543,125 | B2 | 6/2009 | Gokhale |
| 7,546,324 | B2 | 6/2009 | Prahlad et al. |
| 7,581,077 | B2 | 8/2009 | Ignatius et al. |
| 7,603,386 | B2 | 10/2009 | Amarendran et al. |
| 7,606,844 | B2 | 10/2009 | Kottomtharayil |
| 7,613,748 | B2 | 11/2009 | Brockway et al. |
| 7,613,752 | B2 | 11/2009 | Prahlad et al. |
| 7,617,253 | B2 | 11/2009 | Prahlad et al. |
| 7,617,262 | B2 | 11/2009 | Prahlad et al. |
| 7,620,710 | B2 | 11/2009 | Kottomtharayil et al. |
| 7,636,743 | B2 | 12/2009 | Erofeev |
| 7,651,593 | B2 | 1/2010 | Prahlad et al. |
| 7,657,550 | B2 | 2/2010 | Prahlad et al. |
| 7,660,807 | B2 | 2/2010 | Prahlad et al. |
| 7,661,028 | B2 | 2/2010 | Erofeev |
| 7,739,459 | B2 | 6/2010 | Kottomtharayil et al. |
| 7,747,579 | B2 | 6/2010 | Prahlad et al. |
| 7,757,043 | B2 | 7/2010 | Kavuri et al. |
| 7,769,961 | B2 | 8/2010 | Kottomtharayil et al. |
| 7,801,864 | B2 | 9/2010 | Prahlad et al. |
| 7,802,067 | B2 | 9/2010 | Prahlad et al. |
| 7,809,914 | B2 | 10/2010 | Kottomtharayil et al. |
| 8,156,086 | B2 | 4/2012 | Lu et al. |
| 8,170,995 | B2 | 5/2012 | Prahlad et al. |
| 8,229,954 | B2 | 7/2012 | Kottomtharayil et al. |
| 8,230,195 | B2 | 7/2012 | Amarendran et al. |
| 8,285,681 | B2 | 10/2012 | Prahlad et al. |
| 8,307,177 | B2 | 11/2012 | Prahlad et al. |
| 8,364,652 | B2 | 1/2013 | Vijayan et al. |
| 8,370,542 | B2 | 2/2013 | Lu et al. |
| 2006/0041505 | A1* | 2/2006 | Enyart ............ 705/40 |
| 2006/0224846 | A1 | 10/2006 | Amarendran et al. |
| 2007/0067587 | A1* | 3/2007 | Rossi ............ 711/162 |
| 2008/0014941 | A1* | 1/2008 | Catovic et al. ............ 455/436 |
| 2009/0319534 | A1 | 12/2009 | Gokhale |
| 2009/0319667 | A1* | 12/2009 | Bansal et al. ............ 709/227 |
| 2010/0106685 | A1* | 4/2010 | Ott et al. ............ 707/611 |
| 2010/0299490 | A1 | 11/2010 | Attarde et al. |
| 2012/0150818 | A1 | 6/2012 | Vijayan Retnamma et al. |
| 2012/0150826 | A1 | 6/2012 | Vijayan Retnamma et al. |
| 2013/0346558 | A1* | 12/2013 | Khalidi et al. ............ 709/218 |

FOREIGN PATENT DOCUMENTS

| | | |
|---|---|---|
| DE | 69415115 | 8/1999 |
| DE | 60020978 | 4/2006 |
| EP | 0259912 | 3/1988 |
| EP | 0405926 | 1/1991 |
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| EP | 1384135 | 1/2004 |
| GB | 2447361 | 9/2008 |
| JP | 4198050 | 12/2008 |
| JP | 4267443 | 5/2009 |
| WO | WO 95/13580 | 5/1995 |
| WO | WO 99/12098 | 3/1999 |
| WO | WO 2004/023317 | 3/2004 |
| WO | WO 2006/052872 | 5/2006 |

OTHER PUBLICATIONS iPhone User's Guide Date.*
iOS 5 (Wikipedia.org, retrieved Jun. 3, 2014).*
Arneson, "Mass Storage Archiving in Network Environments" IEEE, Oct. 31-Nov. 1998, pp. 45-50.
Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Eitel, "Backup and Storage Management in Distributed Heterogeneous Environments," IEEE, 1994, pp. 124-126.
IBM Technical Disclosure Bulletin, vol. 24, No. 5, Oct. 1981 New York, US, pp. 2404-2406, K.L. Huff, "Data Set Usage Sequence Number".
Rosenblum et al., "The Design and Implementation of a Log-Structure File System," Operating Systems Review SIGOPS, vol. 25, No. 5, May 1991, New York, US, pp. 1-15.

* cited by examiner

INTELLIGENT SCHEDULING FOR REMOTE COMPUTERS

TECHNICAL FIELD

The present subject matter relates to systems and methods to perform scheduled data backup and/or synchronization with portable or remote devices that typically have infrequent or unpredictable connections to a data storage network.

BACKGROUND OF THE INVENTION

Performing data synchronization is an important task in any system the processes and manages data. Synchronization is particularly important when a data volume residing in one location in a system is to be replicated and maintained on another part of the system for data security purposes. Replicated data volumes can be used, for example, for backup repositories, data stores, or in synchronous networks which can utilize multiple workstations requiring identical data storage.

File replication may include continually capturing write activity on a source computer and transmitting this write activity from the source computer to a destination or target computer in real-time or near real-time. A first step in some existing file replication systems, as illustrated in FIG. 1, is typically a synchronization process to ensure that the source data 22 at a source device and the destination data 24 at a destination storage device are substantially the same. That is, before a destination computer 28 can begin storing write activity associated with the source data 22 at a source computer 26, the system 20 may check to determine if the previously written source data 22 is stored at the destination computer 28, so restore points and other restore data may be updated and indexed.

The file replication, if not occurring in real-time, is scheduled to occur at particular intervals. Typically the scheduling is set by the administrator at a central location and the instructions are passed to servers responsible for coordinating the data transfer. The servers then communicate with client devices over a network (local (LAN), wide (WAN), Internet, etc.) triggering the backup or synchronization routine according to schedule. For example, certain levels of backup/storage can occur every night, every week or every month. Additionally, different devices and files on those devices can be scheduled at different intervals.

In recent years, more and more users are working on portable devices, such as Personal Digital Assistants (PDAs), Smart Phones, laptops and tablet computers. These devices may rarely be connected to the data storage network on the LAN. Thus, even though these devices are scheduled to be backed up, if the device is not on the LAN at the time the servers send the instructions, the data is not synchronized.

This presents a concern to system administrators and network operators, because portable devices are at higher risk of being lost or damaged and as such should be synchronized more often, not less. Hence, a need exists for scheduling portable devices so that the data on them is retrieved and stored in a timely manner and with minimum interruption to the user.

SUMMARY

Thus, systems and methods of the present invention address the deficiencies pointed out above an other shortcomings of conventional systems as further described herein.

One example is a method for scheduling data storage events in a storage network that can have a portable device communicating over a network with a server. The method can include configuring, at the server, and deploying to the portable device, a data storage policy. The data storage policy can be implemented on the portable device using an intelligent scheduling agent. At least one threshold event can be monitored on the portable device to determine if the threshold event has occurred. Once the event has occurred, a request can be transmitted to the server to implement a data storage event. The server will then respond to the request and implement the data storage event the portable device.

In another example, the transmission of the request can be delayed for a predetermined time. Further monitoring of the threshold event can occur during the delay. If it is determined that the at least one threshold event has ceased to occur, the transmission can be cancelled.

Monitoring of at least one threshold event can also occur during the implementation of the data storage policy. Again, if it is determined that the threshold event has ceased to occur, the intelligent scheduling agent can suspend the implementation of the data storage event.

The monitoring can include monitoring a time interval, the network, a power state of the portable device, CPU utilization of the portable device, a data store communicating with the portable device, and a priority rank. The monitoring of the network can also entail monitoring a link between the portable device and the server, and monitoring an IP address of the server.

Monitoring the power state may monitor an A/C power status or the battery power status of the portable device. The monitoring the CPU utilization can include comparing an actual CPU utilization to a preset CPU threshold. Monitoring the data store may include comparing an actual data store capacity to a pr data store capacity threshold.

In another example of protecting data on a mobile computing device using a storage network, a method can deploy to the mobile computing device, a synchronization agent. A synchronization policy can be associated with the synchronization agent. The mobile computing device can be monitored for at least one threshold event and, once determined that the at least one threshold has occurred, transmit a request to initiate a data synchronization event. The request can be responded to by synchronizing the mobile computing device with the storage network.

The method may further include periodically updating the synchronization policy. The updating of the synchronization policy can be performed when a data synchronization event occurs or based on network administrator input. Alternately, the updating of the synchronization policy can be performed based on input from a user of the mobile computing device. Further, the updating of the synchronization policy can be performed substantially automatically based on changing conditions in the storage network or mobile computing device.

As a result, a portable device can be backed-up or its data synchronized during the times when it is available on the network, as opposed to when the device is scheduled by a server.

Additional advantages and novel features will be set forth in part in the description which follows, and in part will become apparent to those skilled in the art upon examination of the following and the accompanying drawings or can be learned by production or operation of the examples. The advantages of the present teachings can be realized and attained by practice or use of various aspects of the methodologies, instrumentalities and combinations set forth in the detailed examples discussed below, which are illustrative in nature and not to be deemed as limiting.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to the intelligent scheduling of backups, synchronization, and file storage in remote and portable computing devices.

Figure 1:
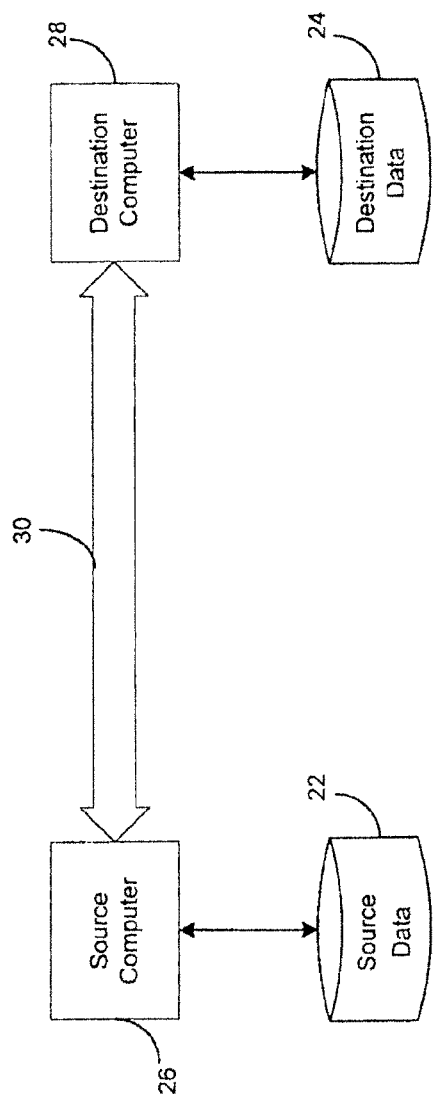
FIG. 1 is a block diagram of a prior art system.
Figure 2:
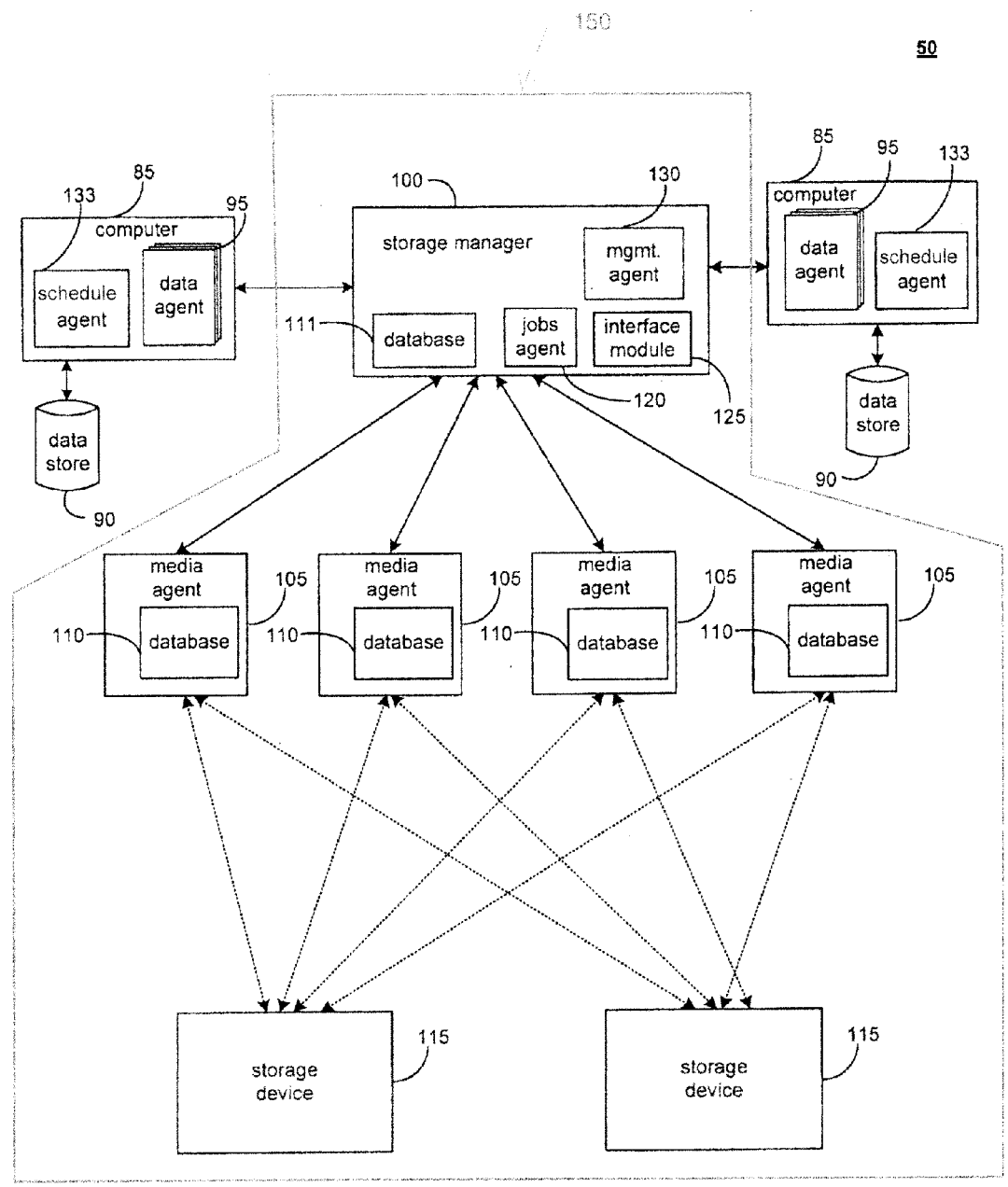
FIG. 2 is a block diagram of a system for performing storage operations on electronic data in a computer network in accordance with certain aspects of the present invention.

Reference now is made in detail to the examples illustrated in the accompanying drawings and discussed below. FIG. 2 illustrates exemplary aspects and features of the present invention. FIG. 2 is a block diagram of a storage operation cell 50 that can perform storage operations on electronic data in a computer network in accordance with an example as illustrated. As shown, a storage operation cell 50 can generally include a storage manager 100, a data agent 95, a media agent 105, a storage device 115, a client computer 85, a data or information store 90, and, can include certain other components such as databases 110, 111, a jobs agent 120, an interface module 125, a management agent 130, and an intelligent scheduling agent 133. Portions of such a system and elements thereof are exemplary of a modular storage management systems such as the CommVault QiNetix™ system, and also the CommVault GALAXY™ backup system, available from CommVault Systems, Inc. of Oceanport, N.J., and further described in U.S. Pat. No. 7,035,880, which is incorporated herein by reference in its entirety.

A storage operation cell, such as cell 50, can generally include combinations of hardware and software components associated with performing storage operations on electronic data. Exemplary storage operation cells according to examples of the invention can include CommCells as embodied in the QNet storage management system and the QiNetix storage management system by CommVault Systems of Oceanport, N.J. According to some examples of the invention, storage operations cell 50 can be related to backup cells and provide some or all of the functionality of backup cells as described in U.S. Pat. No. 7,454,566 which is hereby incorporated by reference in its entirety.

Storage operations performed by storage operation cell 50 can include creating, storing, retrieving, and migrating primary data copies and secondary data copies (which may include, for example, snapshot copies, backup copies, Hierarchical Storage Management ("HSM") copies, archive copies, and other types of copies of electronic data). Storage operation cell 50 can also provide one or more integrated management consoles for users or system processes to interface with in order to perform certain storage operations on electronic data as further described herein. Such integrated management consoles can be displayed at a central control facility or several similar consoles distributed throughout multiple network locations to provide global or geographically specific network data storage information. The use of integrated management consoles can provide a unified view of the data operations across the network.

In addition to the integrated management consoles that allow an interface for the server side components 150, the intelligent scheduling agent 133 can include a similar management console, in either form or function, for the client devices 85. The intelligent scheduling agent 133 and the client devices 85 are discussed in more detail below.

A unified view of the data operations collected across the entire storage network can provide an advantageous benefit in the management of the network. The unified view can of the utilized resources of the network. Presenting such data to one centralized management console can allow for a more complete and efficient administration of the available resources of the network. The storage manager 100, either via a preconfigured policy or via a manual operation from a system administrator, can reallocate resources to more efficiently run the network. Data paths from storage operation cells can be re-routed to avoid areas of the network which are congested by taking advantage of underutilized data paths or operation cells. Additionally, should a storage operation cell arrive at or exceed a database size maximum, storage device capacity maximum or fail outright, several routes of redundancy can be triggered to ensure the data arrives at the location for which it was intended. A unified view can provide the manager with a collective status of the entire network allowing the system to adapt and reallocate the many resources of the network for faster and more efficient utilization of those resources.

In some examples, storage operations can be performed according to rage policy. A storage policy generally can be a data structure or other information source that includes a set of preferences and other storage criteria for performing a storage operation and/or other functions that relate to storage operation. The preferences and storage criteria can include, but are not limited to, a storage location, relationships between system components, network pathway to utilize, retention policies, data characteristics, compression or encryption requirements, preferred system components to utilize in a storage operation, and other criteria relating to a storage operation. For example, a storage policy can indicate that certain data is to be stored in a specific storage device, retained for a specified period of time before being aged to another tier of secondary storage, copied to secondary storage using a specified number of streams, etc. In one example, a storage policy can be stored in a storage manager database 111. Alternatively, certain data may be stored to archive media as metadata for use in restore operations or other storage operations. In other examples, the data may be stored to other locations or components of the system.

A schedule policy specifies when and how often to perform storage operations and can also specify performing certain storage operations (i.e. replicating certain data) on sub-clients of data including how to handle those sub-clients. A sub-client can represent static or dynamic associations of portions of data of a volume and are generally mutually exclusive. Thus, a portion of data may be given a label and the or other storage location used by the system. Sub-clients may also be used as an effective administrative scheme of organizing data according to data type, department within the enterprise, storage preferences, etc. For example, an administrator may find it preferable to separate e-mail data from financial data using two different sub-clients having different storage preferences, retention criteria, etc.

Storage operation cells may contain not only physical devices, but also may represent logical concepts, organizations, and hierarchies. For example, a first storage operation cell 50 can be configured to perform HSM operations, such as data backup or other types of data migration, and can include a variety of physical components including a storage manager 100 (or management agent 130), a media agent 105, a client component 85, and other components as described herein. A second storage operation cell can contain the same or similar physical components. However, it may be configured to perform storage resource management ("SRM") operations, such as monitoring a primary data copy or performing other known SRM operations.

In one example, a data agent 95 can be a software module or part of a software module that is generally responsible for archiving, migrating, and recovering data from client computer 85 stored in an information store 90 or other memory location. Each computer 85 has at least one data agent and a intelligent scheduling agent 133. Storage operation cell 50 can also support computers 85 having multiple clients (e.g., each computer can have multiple applications, with each application considered as either a client or sub-client).

In some examples, the data agents 95 can be distributed between client computer 85 and the storage manager 100 (and any other intermediate components (not explicitly shown)) or can be deployed from a remote location or its functions approximated by a remote process that performs some or all of the functions of the data agent 95. The data agent 95 can also generate metadata associated with the data that it is generally responsible for replicating, archiving, migrating, and recovering from client computer 85. This metadata can be appended or embedded within the client data as it is transferred to a backup or secondary storage location, such as a replication storage device, under the direction of storage manager 100.

One example can also include multiple data agents 95, each of which can be used to backup, migrate, and recover data associated with a different application. For example, different individual data agents 95 can be designed to handle MICROSOFT EXCHANGE® data, MICROSOFT SHAREPOINT® data or other collaborative project and document management data, LOTUS NOTES® data, MICROSOFT WINDOWS 2000® file system data, MICROSOFT® Active Directory Objects data, and other types of data known in the art. Alternatively, one or more generic data agents 95 can be used to handle and process multiple data types rather than using the specialized data agents described above.

In an example utilizing a client computer 85 having two or more types of data, one data agent 95 can be used for each data type to archive, migrate, and restore the client computer 85 data. For example, to backup, migrate, and restore all of the data on a MICROSOFT EXCHANGE 2000® server, the client computer 85 can use one MICROSOFT EXCHANGE 2000® Mailbox data agent to backup the EXCHANGE 2000® mailboxes, one MICROSOFT EXCHANGE 2000® Database data agent to backup the EXCHANGE 2000® databases, one MICROSOFT EXCHANGE 2000®. Public Folder data agent to backup the EXCHANGE 2000® Public Folders, and one MICROSOFT WINDOWS 2000® File System data agent to backup the file system of the computer 85. These data agents 95 would be treated as four separate data agents 95 by the system even though they reside on the same client computer 85.

In an alternative example, one or more generic data agents 95 can be used, each of which can be capable of handling two or more data types. For example, one generic data agent 95 can be used to back up, migrate and restore MICROSOFT EXCHANGE 2000® Mailbox data and MICROSOFT EXCHANGE 2000® Database data while another generic data agent can handle MICROSOFT EXCHANGE 2000® Public Folder data and MICROSOFT WINDOWS 2000® File System data.

While the illustrative examples described herein detail data agents implemented, specifically or generically, for Microsoft® applications, one skilled in the art should recognize that other application types (i.e. Oracle data, SQL data, LOTUS NOTES®, etc.) can be implemented without deviating from the scope of the present invention.

In one example, the storage manager 100 can include a software module (not shown) or other application that can coordinate and control storage operations performed by storage operation cell 50. The storage manager 100 can communicate with the elements of storage operation cell 50 including computers 85, data agents 95, media agents 105, and storage devices 115.

In one example the storage manager 100 can include a jobs agent 120 that monitors the status of some or all storage operations previously performed, currently being performed, or scheduled to be performed by the storage operation cell 50. The jobs agent 120 can be linked with an interface module 125 (typically a software module or application). The interface module 125 can include information processing and display software, such as a graphical user interface ("GUI"), an application program interface ("API"), or other interactive interface through which users and system processes can retrieve information about the status of storage operations. Through the interface module 125, users can optionally issue instructions to various storage operation cells 50 regarding performance of the storage operations as described and contemplated by example of the present invention. For example, a user can modify a schedule concerning the number of pending snapshot copies or other types of copies scheduled as needed to suit particular needs or requirements. As another example, a user can utilize the GUI to view the status of pending storage operations in some or all of the storage operation cells in a given network or to monitor the status of certain components in a particular storage operation cell (e.g., the amount of storage capacity left in a particular storage device). As a further example, the interface module 125 can display the cost metrics associated with a particular type of data storage and can allow a user to determine the overall and target cost metrics associated with a particular data type. This determination can also be done for specific storage operation cells 50 or any other storage operation as predefined or user-defined.

One example of the storage manager 100 can also include a management agent 130 that is typically implemented as a software module or application program. The management agent 130 can provide an interface that allows various management components in other storage operation cells 50 to communicate with one another. For example, one example of a network configuration can include multiple cells adjacent to one another or otherwise logically related in a WAN or LAN configuration (not explicitly shown). With this arrangement, each cell 50 can be connected to the other through each respective management agent 130. This allows each cell 50 to send and receive certain pertinent information from other cells including status information, routing information, information regarding capacity and utilization, etc. These communication paths can also be used to convey information and instructions regarding storage operations.

In an example, the management agent 130 in the first storage operation cell 50 may communicate with a management agent 130 in a second storage operation cell (not illustrated) regarding the status of storage operations in the second storage operation cell. Another illustrative example may include a first management agent 130 in a first storage operation cell 50 that may communicate with a second management agent in a second storage operation cell to control the storage manager (and other components) of the second storage operation cell via the first management agent 130 contained in the storage manager 100 of the first storage operation cell.

Another illustrative example may include the management agent 130 in the first storage operation cell 50 communicating directly with and controlling the components in a second storage management cell (not illustrated), bypassing the storage manager 100 in the second storage management cell. In an alternative example, the storage operation cells may also be organized hierarchically such that hierarchically superior cells control or pass information to hierarchically subordinate cells or vice versa.

The storage manager 100 can also maintain, in an 111. The data stored in the database 111 can be used to indicate logical associations between components of the system, user preferences, management tasks, Storage Resource Management (SRM) data, Hierarchical Storage Management (HSM) data or other useful data. The SRM data can, for example, include information that relates to monitoring the health and status of the primary copies of data (e.g., live or production line copies). HSM data can, for example, be related to information associated with migrating and storing secondary data copies including archival volumes to various storage devices in the storage system. As further described herein, some of this information can be stored in a media agent database 110 or other local data store. For example, the storage manager 100 can use data from the database 111 to track logical associations between the media agents 105 and the storage devices 115.

In one example, a media agent 105 can be implemented as a software module that conveys data, as directed by the storage manager 100, between computer 85 and one or more storage devices 115 such as a tape library, a magnetic media storage device, an optical media storage device, or any other suitable storage device. Media agents 105 can be linked with and control a storage device 115 associated with a particular media agent. In some examples, a media agent 105 can be considered to be associated with a particular storage device 115 if that media agent 105 is capable of routing and storing data to particular storage device 115.

In operation, a media agent 105 associated with a particular storage device 115 can instruct the storage device to use a robotic arm or other retrieval means to load or eject a certain storage media, and to subsequently archive, migrate, or restore data to or from that media. The media agents 105 can communicate with the storage device 115 via a suitable communications path such as a SCSI (Small Computer System Interface), fiber channel or wireless communications link or other network connections known in the art such as a WAN or LAN. Storage device 115 can be linked to a data agent 105 via a Storage Area Network ("SAN").

Each media agent 105 may maintain an index cache, a database, or other data structure 110 which may store index data generated during backup, migration, and restore and other storage operations as described herein. For example, performing storage operations on MICROSOFT EXCHANGE® data may generate index data. Such index data provides the media agent 105 or other external device with a fast and efficient mechanism for storage manager database 111 can store data associating a client computer 85 with a particular media agent 105 or storage device 115 as specified in a storage policy. The media agent database 110 can indicate where, specifically, the computer data is stored in the storage device 115, what specific files were stored, and other information associated with storage of the computer data. In some examples, such index data can be stored along with the data backed up in the storage device 115, with an additional copy of the index data written to the index cache 110. The data in the database 110 is thus readily available for use in storage operations and other activities without having to be first retrieved from the storage device 115.

In some examples, certain components can reside and execute on the same computer. For example, a client computer 85 including a data agent 95, a media agent 105, or a storage manager 100 coordinates and directs local archiving, migration, and retrieval application functions as further described in U.S. Pat. No. 7,035,880. Thus, client computer 85 can function independently or together with other similar client computers 85.

Intelligent scheduling agent 133 can initiate and manage system backups, migrations, and data recovery. In some embodiments, intelligent scheduling agent 133 may be implemented on each client computer 85, or can exist as a separate module or may be integrated with all or part of data agent 95. As a separate module, the intelligent scheduling agent 133 may communicate with all or some of the software modules in storage operation cell 50. For example, intelligent scheduling agent 133 can communicate with the storage manager 100, other data agents 95, the media agents 105, other scheduling agents 133, and/or storage devices 115.

During normal operation, some client computers 85 may be frequently disconnected from system 50 and may be mobile client computing devices such as a PDA or laptop computer. In embodiments of the invention, such client computers 85 may maintain and manage the synchronization of data between storage operation cell 50 and mobile computer 85 using the systems and methods further described herein, some of which include intelligent scheduling agent 133. For example, intelligent scheduling agent 133 may be used as a means to initiate and manage a data synchronization operation between data store 90 (which, e.g., may be the memory of a portable electronic device) and one or more of storage devices 115. This may occur when computer 85 is connected to cell 50 or expected to be connected to cell 50.

For example, synchronization, or attempted synchronization may initially be time-based (e.g., based on pre-scheduled time intervals), and then if backup fails to complete in this way after a period of time, connection-based (e.g., occur when mobile device 85 senses a connection network 85). For example, the initial synchronization may be attempted based on certain times when computer 80 is expected to be connected to cell 50 (e.g. at night) and/or when such a connection is effected and sensed by agent 133 (and at least one synchronization threshold has been reached).

Intelligent scheduling agent 133 can also initiate and manage a storage operation between two data stores 90 and associated storage devices, such as devices 115, each in a separate storage operation cell 50 implemented as primary storage.

Figure 3:
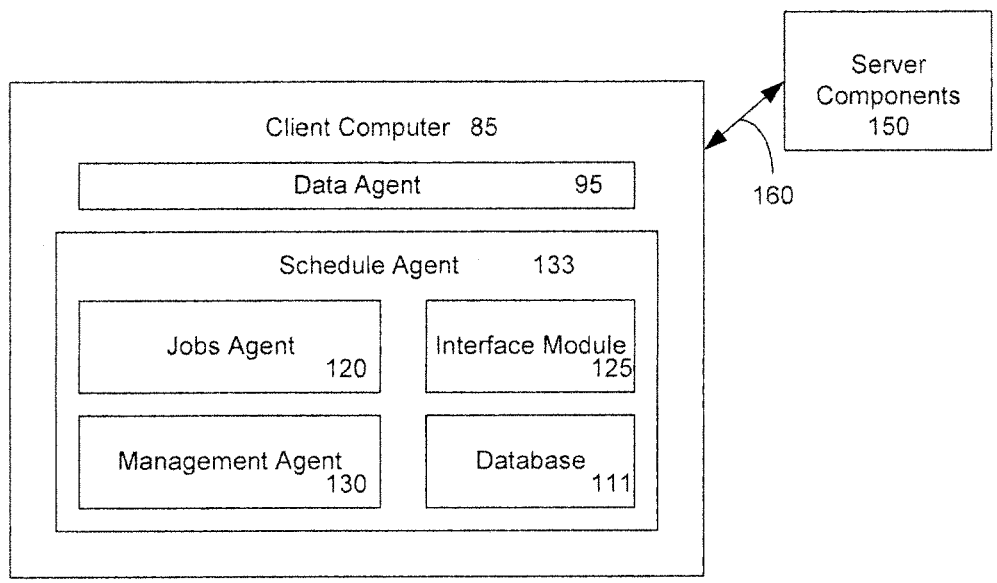
FIG. 3 is a block diagram of an example of a portable client computer configured in accordance with certain aspects of the present invention.

Turning now to FIG. 3, more a detailed view of an exemplarily portable client computer 85 is illustrated. Portable client computer 85, for example, may take the form of capabilities to support certain text and image communications, such as email, picture communication and web browsing applications. In another example, the client computer 85 may also be a mobile station which is a portable computing device, i.e. a handheld, laptop personal computer (PC), tablet computer (iPad®), or the like. Client computer 85 can also take the form of a personal digital assistant (PDA) or BlackBerry type device incorporating networking capabilities.

In some embodiments, intelligent scheduling agent 133 can exist separate from data agent 95, jobs agent 120, management agent 130, interface module 125, and/or database 111 or replicate one or all of the functions of some or all of the above elements. Intelligent scheduling agent 133 may communicate over a link 160 to server components 150 to schedule and implement a data storage policy for computer 85. Link 160, in certain examples, can be a LAN (local area network) connection, a WAN (wide area network) connection, the Internet, or any secured or unsecured communications line, which in some embodiments may include one or more wireless links.

Figure 4:
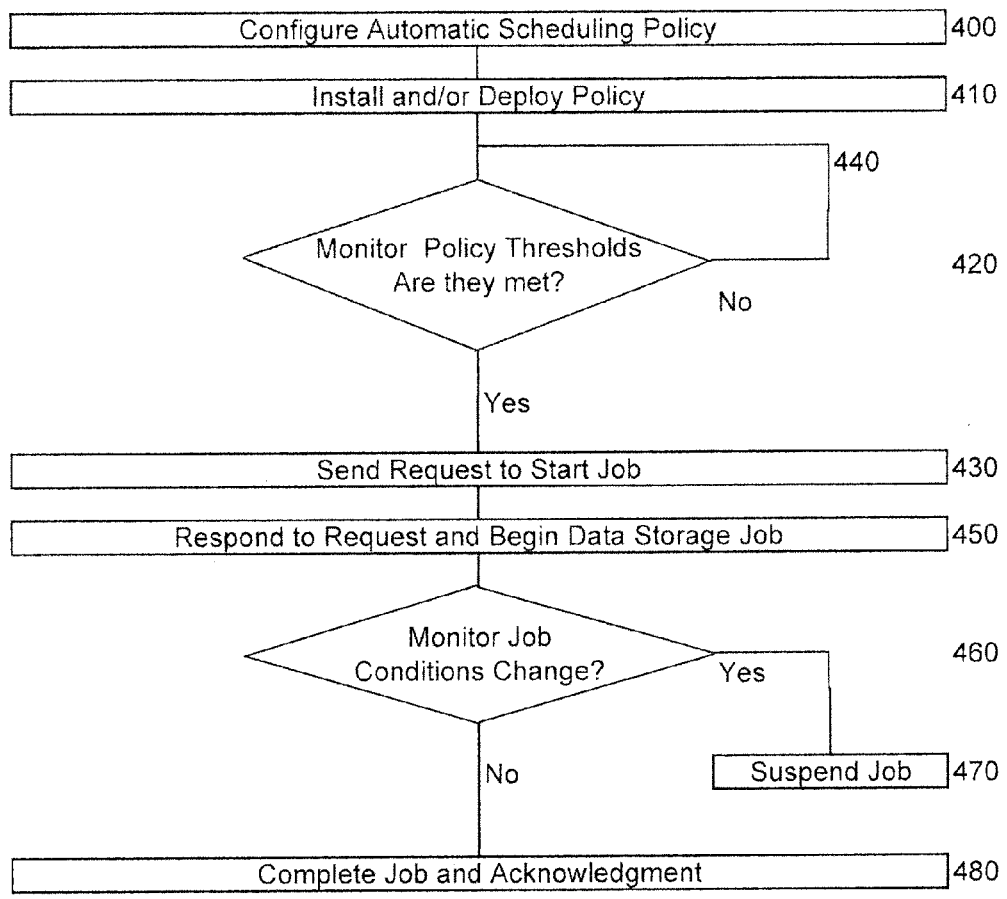
FIG. 4 is a flow chart illustrating some of the steps to implement an exemplary intelligent data storage schedule.

In the example illustrated in FIG. 4, the data storage policy for each cell 50 (or groups of cells) may be configured and deployed to some or all of the computing elements in that cell 50. This policy is typically configured at a central element, e.g., the storage manager 100, by the administrator (Step 400). The administrator may set data storage "windows" for when client computers 85 can be backed up or synchronized, what information is backed up (certain files, programs, entire drives, etc.) and to what storage devices 115 the data is sent to. This policy can then be deployed over the network and/or installed on individual computers 85 (Step 410). In the embodiment shown in FIG. 3, the policy can be transmitted to the portable client computer 85 over link 160.

In conventional systems, the storage policy is typically not sent to the individual client computers 85. Rather, a central manager monitors the elements on the network and sends instructions to the individual elements when the time comes to implement the data storage protocol. If, however, as noted above, a portable client computer 85 is not connected to the network at the time central manager attempts to backup computer 85, the attempt failed. After noting the failure, the central manager may reschedule the data storage job for the next scheduled time window. This rescheduling takes place based on the assumption that portable client computer 85 is continuously or frequently connected to the network.

Often, however, mobile client computer 85 is not attached to the network at regular or predictable intervals, and the device is continuously rescheduled for backup, which may never occur, or occur infrequently, placing its data in jeopardy.

One way aspects of the present invention addresses this shortcoming is to implement a storage policy directly on portable client computer 85. For example, the storage policy may be deployed on computer 85 along with (or associated with) intelligent scheduling agent 133. In this case, the intelligent scheduling agent 133 may reference this set of policy parameters such as backup thresholds, file types to back up, priority backup information, etc. and does not rely on a central manager for backup prompts. Such policy parameters can be set in advance by the administrator or by the user of portable client computer 85. Intelligent scheduling agent 133 may then monitor the operation of portable client computer 85 for the preset policy thresholds (step 420). If the thresholds are not met, intelligent scheduling agent 133 continues to monitor the relevant metrics and may notify the user when backup is imminent so a network connection and subsequent timely synchronization can be arranged (step 440).

Once one or more policy thresholds are met, the next time portable computer 85 is connected to the network, intelligent scheduling agent 133 may send a request to storage manager 100 to start a data storage job (or synchronization) (Step 430). Storage manager 100 receives the request and coordinates the data transfer process (Step 450). While the data transfer job is underway, intelligent scheduling agent 133 may continue to monitor the conditions on the portable client computer 85 (Step 460).

During job monitoring, if the conditions on the portable client computer 85 change, or the computer is disconnected from the network, intelligent scheduling agent 133 may suspend, cancel or reschedule the job until the threshold conditions are yet again met, and the job can be restarted (Step 470). If the conditions do not change to the point where the intelligent scheduling agent 133 suspends the job, the data storage job typically proceeds to completion. Storage manager 100 may then acknowledge the completion of the job and the intelligent scheduling agent 133 can update its records accordingly and reset certain thresholds regarding the data storage status of the portable client computer 85 (Step 480). This may involve saving restore point information and resetting certain backup thresholds, etc.

In certain embodiments, during the monitoring step described above, intelligent scheduling agent 133 may assume partial or full control of the backup or synchronization operation from storage manager 100 and handle some or all coordination and/or scheduling functions associated therewith.

In a typical data storage hierarchy, storage manager 100 begins the operation and maintains control until completion or separation. In some embodiments, intelligent scheduling agent 133 may take control of the job after storage manager 100 initiates it. This may occur after manager 100 provides certain basic information such as routing or storage device addresses and may direct agent 133 to provide termination or completion codes or to cede control back to manager 100 under certain circumstances (overflow, network failure or outage, etc.). In this mode, intelligent scheduling agent stop, suspend, and restart or redefine the job as conditions dictate (control mode). Scheduling agent 133 may then inform storage manager 100 of the final outcome of the job so it can update the data storage records accordingly, e.g., whether the job was completed, cancelled, or suspended for another time, and as well as what files or file types were stored, update indexes, etc.

Figure 5:
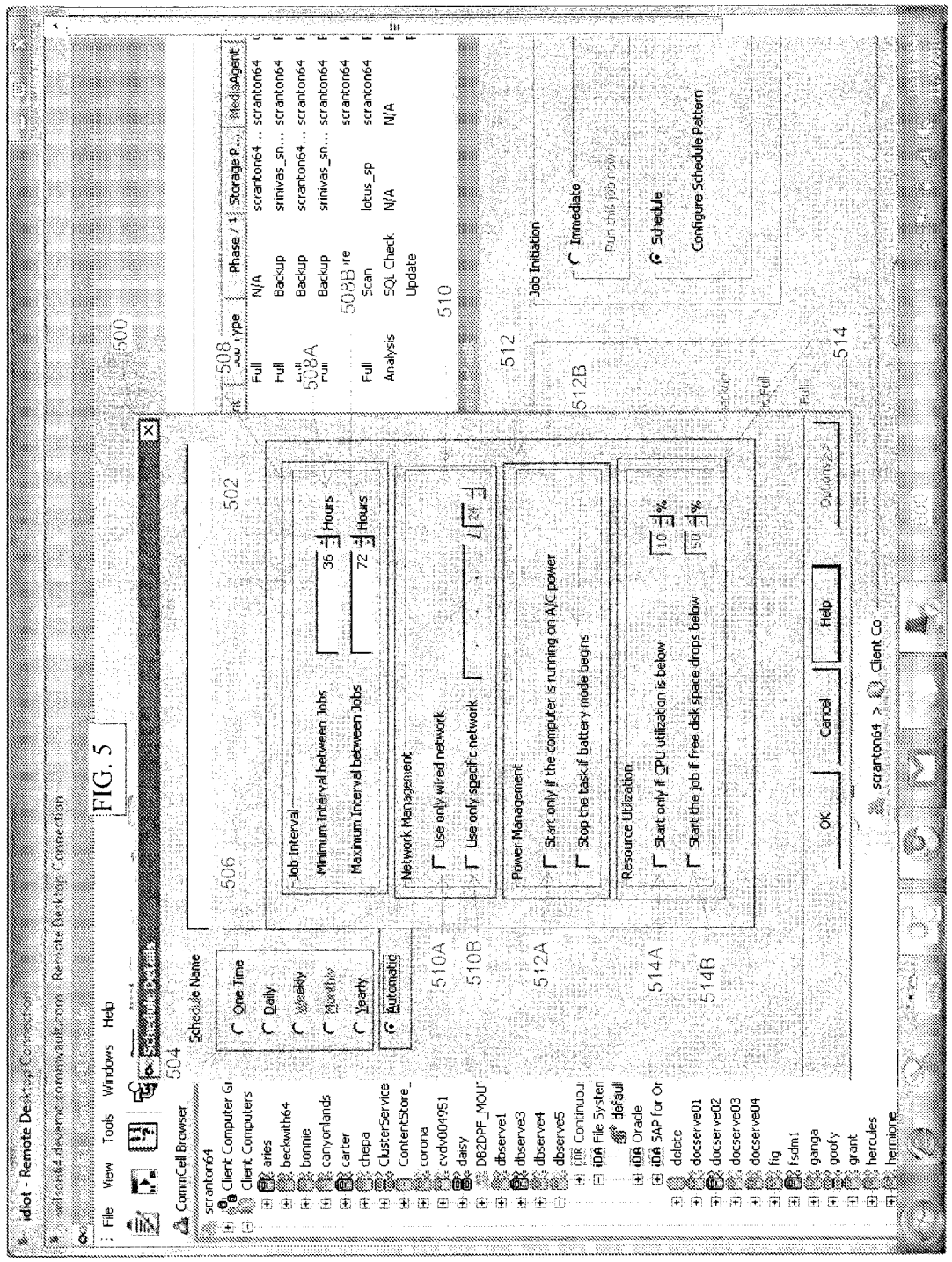
FIG. 5 is screen image and example of certain scheduling options in accordance with certain aspects of the present invention.

To expand on the above, FIG. 5 illustrates an example of a scheduling or policy configuration screen 500. This screen interface can be generated as part of a GUI for the intelligent scheduling agent 133 or during the initial policy configuration at the storage manager. Different scheduling events or policies can be configured, and then named in a naming field 502, for ease of recall. Each configuration/policy may initially be scheduled during certain time intervals, in the time interval field 504, or can be configured with different threshold values 506. The time interval field 504 allows a user to schedule a data storage event one time, daily, weekly, monthly, periodically, or as desired by an administrator.

Turning to the example of the threshold value fields 506 in FIG. 5, four major categories of parameters are shown, job interval 508, network link 510, power status 512, and resources 514. For job interval 508, the user or administrator can set the minimum interval at field 508A and the maximum interval at field 508B. The minimum job interval may measure time since the last job initiation attempt—whether the job was successful or not. The minimum interval 508A helps prevent the intelligent scheduling agent 133 from continuously trying to back up or synchronize client computer 85 when all of the threshold conditions are satisfied. The maximum interval acts as a safeguard that can guarantee that backup or synchronization jobs will eventually run, even if the non-critical thresholds are not yet met. The maximum job interval can measure time since the completion time of the last successful job.

The network link 510 options allow the administrator to restrict the data transfer job to only instances when the portable client computer 85 is on a wired network 510A. Thus, no wireless connections, which can be for the LAN, WAN, or external hot spots are allowed. Further, intelligent scheduling agent 133 can restrict data transfer jobs until the portable client computer 85 is on a specific network 510B. This restriction may be selected for numerous reasons. One reason being that the data transfer rate over a wireless network is significantly less than some wired network connections. Additionally, wireless networks can sometimes break connections, thus interrupting the job and can lead to restarting the entire job.

Furthermore, specifying a certain network for backup can be used to ensure that the data is not traveling over an unsecured or public network. For this option, intelligent scheduling agent 133 can monitor the network adaptor to determine the network connection and type.

Moreover, some embodiments may allow certain data to be transferred over wireless links, while other data may require a hard-wired connection. For example, data classified as being under a certain security threshold may be synchronized wirelessly, whereas more sensitive information may require a direct wired network connection (not shown). This approach provides improved security, yet allows the backup or synchronization of other information more freely, thereby reducing hard-wired synchronization time and improving the likelihood at least some data will be backed up or synchronized in a timely fashion, enhancing overall data security.

Returning to FIG. 5, an example of the power status options 512 is shown. In some embodiments, intelligent scheduling agent 133 can monitor the power status of portable client computer 85 and only begin a job if the portable client computer 85 is running on A/C (outlet) power 512A. This option ensures that the client has enough power to maintain the network connection 160 and maintain continuous access to the data store 90. Similar issues are accounted for by stopping a data storage job if the portable client computer 85 switches from A/C power to battery power 512B (and the battery power is below a level that will allow for job completion).

Moreover, in some embodiments, intelligent scheduling agent 133 can monitor the sleep/wake cycle of the portable client computer 85. If all other threshold parameters are met, intelligent scheduling agent 133 can be configured to wake a sleeping client 85 to begin a data storage or synchronization job. In addition, scheduling agent 133 may monitor the life of the battery and determine, based on the type of data storage event to be performed, if the battery has sufficient charge to complete the job. Another example can also make sure that sufficient battery power remains to operate the client for another period of time.

Resource options 514 have similar issues to the power options 512 above. The utilization of the CPU (central processing unit) 514A is a good indicator of whether or not a user is actively using the portable client computer 85. Additionally, if the user is engaged, it can determine to what extent the computational ability is available to assist in the data transfer process. If the user is utilizing a significant portion of the CPU, then the data transfer process slows down as it shares the CPU with the application the user is currently engaged with. One or both of the job and application slow down. The disk space option 514B determines how much disk space remains on data store 90 and if the free disk space drops below a set limit. This is to assure that the data is retrieved and stored in case data is deleted in a effort to free up more available disk space.

Another example of monitoring disk space is monitoring an amount of information that is resident in the data store 90 that has never been backed up. For example, a user adds 20 GB of data to the data store 90. The intelligent scheduling agent 133 can identify that this new data has never been backed up and can send an immediate request for backup or synchronization. Different volumes of new data can be set as the threshold. In one example, it can be as small as 1 GB.

The intelligent scheduling agent 133 can also analyze the new data and if it determines that most of the new data is a program (e.g. executable and related files) it may not count those files to the 1 GB total. Alternately, if the new data is 1 GB of photographs, intelligent scheduling agent 133 can send a job request immediately. Further, the intelligent scheduling agent 133 can monitor the number of existing, but changed, files. If a preset number of files have been changed since the last data storage job, then the intelligent scheduling agent 133 can request a job.

Another option for intelligent scheduling agent 133 is whether or not the Operating System (OS) and its scheduled events take priority over a data storage job. The priority of the job as opposed to the OS can be set independently and for each given instance, the intelligent scheduling agent 133 can determine which processes have a higher priority. Alternately, the job can be given a fixed priority to make sure the job ranks appropriately.

In another example, the intelligent scheduling agent 133 can be considered a type of "opportunistic" scheduler, partially independent of the storage manager 100, and responsible for requesting backups or synchronization based on certain specified criteria. In some embodiments, the intelligent scheduling agent 133 may support multiple schedules/polices per client computer 85. This partial autonomy allows the user more control of the data storage policies acting on the portable device 85. The user can delay a scheduled data storage session, but only for so long until the administrator's policy at the storage manager 100 overrides the push-off and initiates the data backup.

The intelligent scheduling agent 133 can perform its monitoring task, in one example, using probes. The probes are each implemented to monitor specific thresholds on the client device 85. Certain probes can be passive, waiting for the threshold even to occur, while other probes can be active, monitoring the status of certain features on a constant basis.

Another exemplary feature of the intelligent scheduling agent 133 is that it can delay sending a request once the thresholds are met. In this example, once the probes return information that all of the necessary threshold parameters are met, the intelligent scheduling agent 133 can have a preset delay before sending the request. This allows the threshold parameters to stabilize, and if the parameters continue to meet the threshold requirements after the set time (e.g., minutes), then the intelligent scheduling agent 133 transmits the request. This helps to prevent unnecessary backups or backups that start and stop suddenly.

Figure 6:
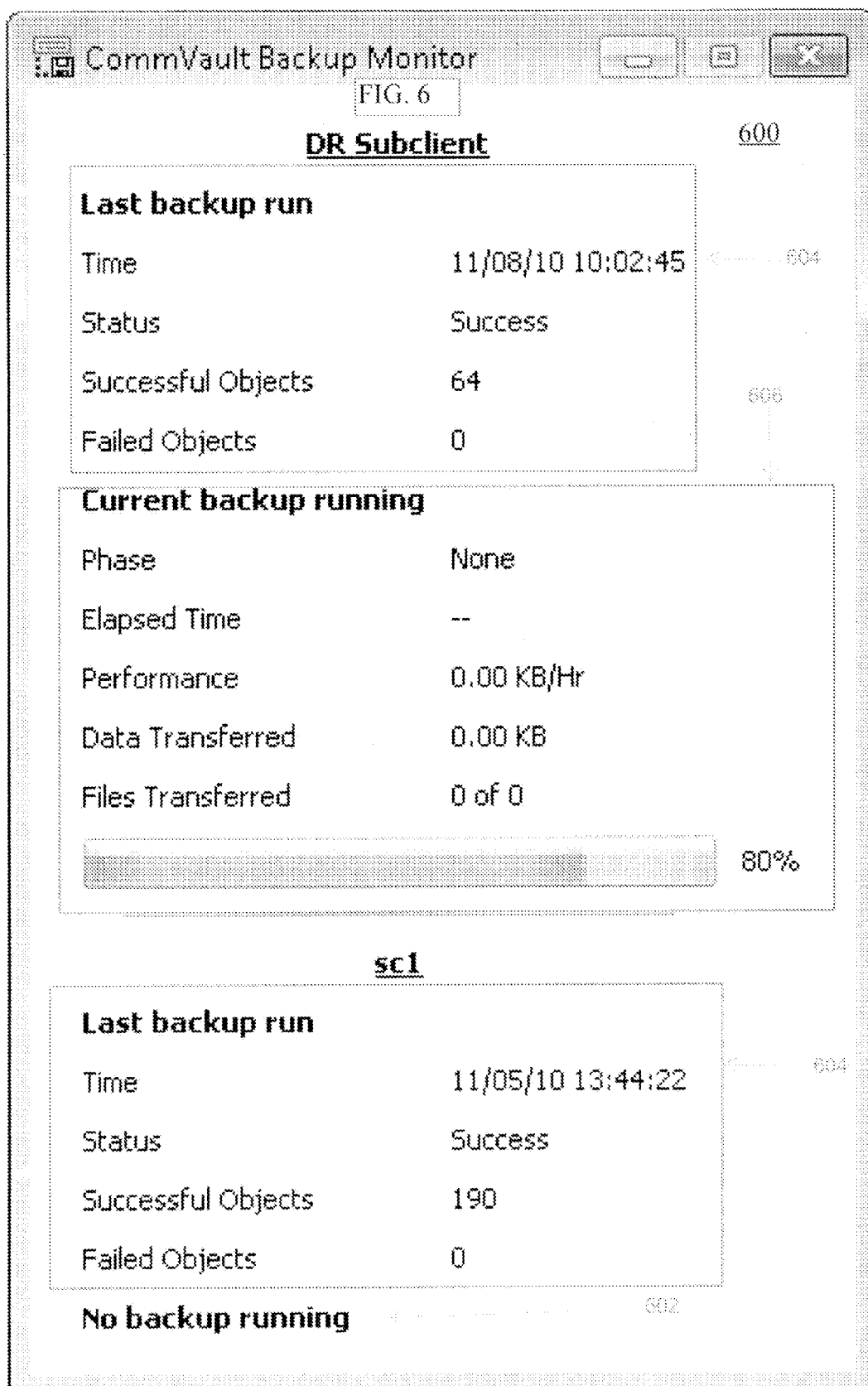
FIG. 6. is screen image and example of a utility resident on the portable device in accordance with certain aspects of the present invention.

Further, to assist the user of the portable client device 85, a small utility program may remain active to notify the user of the activities being performed by the intelligent scheduling agent 133. An example is a "tray utility" as illustrated in FIG. 6. It can be a GUI utility offering a status icon and a simple popup menu in the user's tray. The utility 600 can indicate via an icon/animation whether a job is currently running or not, along with notifications in the expanded view 602. One example of the utility 600 has simple popup menu(s) with "Start", "Stop" and "Advanced" items to schedule data storage jobs. "Start" and "Stop" performs the selected task to the active client backup job. The "Advanced" option can allow access to the menu illustrated in FIG. 5. The utility can also show the time and details of the last successful job 604 for each cell 50. Further, if there is a current job in progress, the status of the particular job can be illustrated 606.

Figure 7:
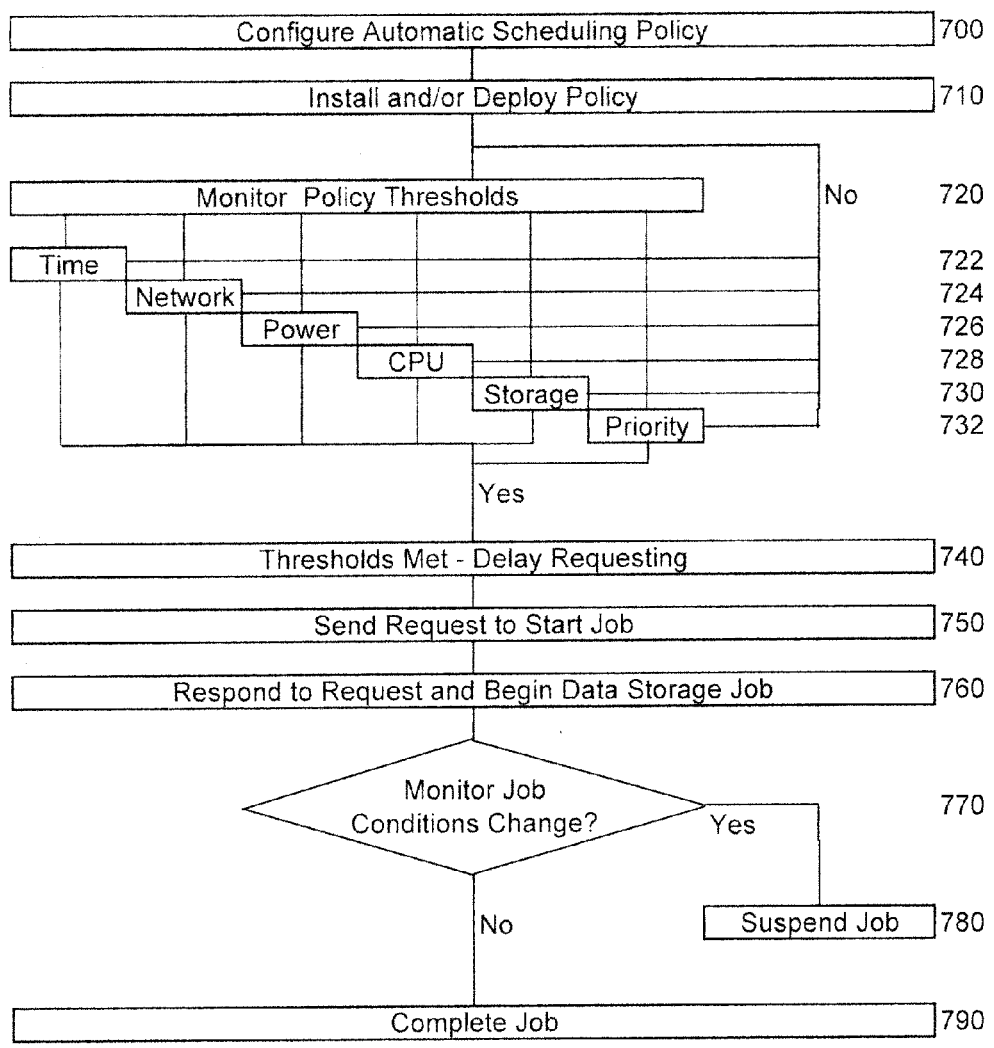
FIG. 7 is a flow chart illustrating an implementation of an exemplary intelligent data synchronization in accordance with certain aspects of the present invention.

In an example of an implementation, as illustrated in FIG. 7, the administrator sets a data storage policy for the cell 50 (Step 700) using the storage manager 100 and pushes the policy to the portable client device 85 (Step 710). The intelligent scheduling agent 133 deploys and activates probes to monitor for the chosen threshold events (Step 720). The storage manager 100 implements the standard policy, but the portable client device 85 is not present on the network to receive the instructions. The intelligent scheduling agent 133 then determines that a threshold event has occurred (Step 722) and that certain threshold events are being reached.

The intelligent scheduling agent 133 checks to determine that portable client device 85 is linked 160 to the server components 150 over an appropriate network (wired, IP address, etc.) (Step 724) and that the power is sufficient to last the length of the job (on A/C power or 100% battery charge, or a policy of 50% minimum power, and more than 10% will remain after the job is completed) (Step 726). Other probes return the CPU utilization (below 10%) (Step 728), the free space status of the data store 90 (45% capacity) (Step 730), and the job/OS priority rank (Step 732).

Given the above, the intelligent scheduling agent 133 determines that enough or the correct number of threshold events have been met. However, before requesting a data storage job to begin, the intelligent scheduling agent 133 pauses and continues monitoring (Step 740). If the threshold events remain after the delay period (e.g., 5 minutes), it then complies with the request and begins the job (Step 760). Intelligent scheduling agent 133 continues to monitor the threshold events and for any user input (Step 770). Depending on the outcome of the monitoring, the job can be suspended (Step 780) or completed (Step 790).

Figure 8:
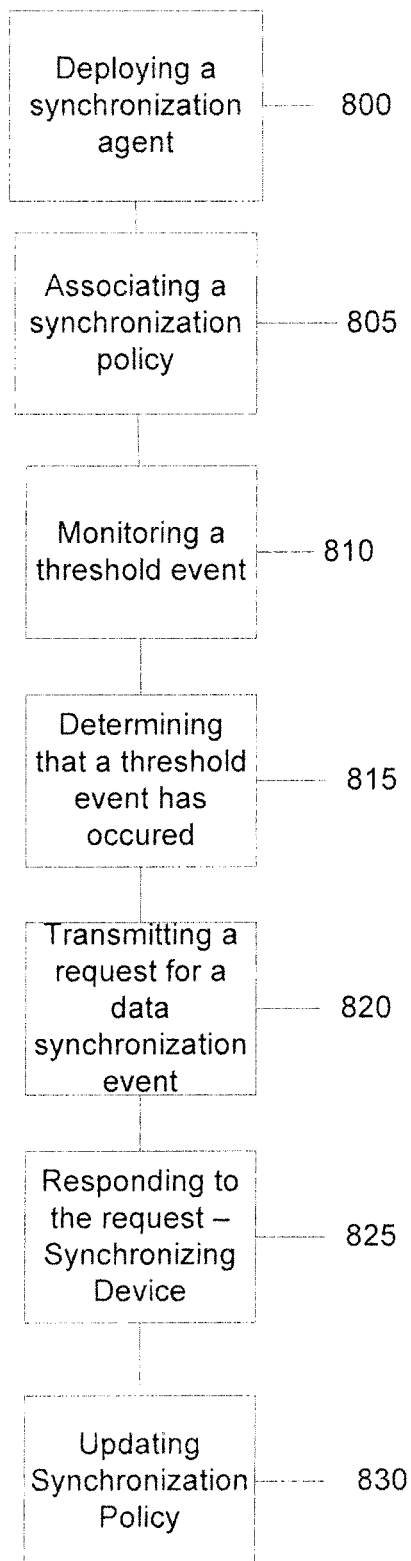
FIG. 8 is a flow chart illustrating another implementation of an exemplary intelligent data synchronization in accordance with certain aspects of the present invention.

FIG. 8 illustrates another example of an implementation to protect data on a mobile computing device using a storage network. This method may include deploying a synchronization agent to the mobile computing device (step 800). The synchronization agent may initiate and manage system backups, migrations, and data recovery. Further, the synchronization agent may communicate with all or some of the software modules in storage operation cell 50. Additionally, it may be used to initiate and manage a data synchronization operation between a data store 90 and one or more of storage devices 115.

A synchronization policy may then be associated with the synchronization agent (step 805). The policy may include parameters such as backup thresholds, file types to back up, priority backup information, etc. In addition, other categories of parameters may include an interval between synchronizations, quality and availability of a network link, a power status of the mobile computing device and what computing resources are available on the mobile computing device.

The synchronization agent may also monitor one or more threshold events on the mobile computing device (step 810). The threshold events can be based on time (e.g. how long since the last synchronization), network parameters (e.g. quality, type and security of the connection), power available on the mobile computing device (e.g. current power level and usage, and expected drain by the proposed synchronization), computing parameters (e.g. is there sufficient storage space and/or can the CPU handle the synchronization task smoothly), and priority (e.g. how important is the synchronization as opposed to other tasks being executed by the mobile computing device).

Once the monitoring has determined that at least one threshold event has occurred (step 815), a request can be transmitted to initiate a data synchronization event (step 820). In some examples, there can be a delay between the determination that the threshold event has occurred and the request. This delay can be used to determine if the threshold events remains after a delay period (e.g., 5 minutes) to make sure the triggering event is not transitory based on a change of operations or a technical glitch or malfunction.

Once the request is received, the response is to then begin a synchronization event to synchronize the mobile computing device with the storage network (step 825).

In another example, the synchronization policy can be periodically updated (step 830). The updating of the synchronization policy can performed when the data synchronization event occurs. Alternately, the updating of the synchronization policy can be performed based on network administrator input. In still another example, the updating of the synchronization policy can performed based on input from a user of the mobile computing device. Further, the updating of the synchronization policy can be performed substantially automatically based on changing conditions in the storage network or mobile computing device.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for scheduling secondary copy operations associated with a plurality of portable client computing devices residing in a storage network including both the plurality of portable client computing devices and a plurality of stationary client computing devices, the method comprising:

storing primary data in at least a plurality of portable computing devices and in a plurality of stationary client computing devices, the primary data generated by one or more applications executing in the plurality of portable computing devices and the plurality of stationary client computing devices;

with a storage manager component comprising computer hardware, providing a graphical user interface (GUI) to that allows a user to configure data storage policies associated with performing secondary copy operations that copy the primary data from both the plurality of portable computing devices and the plurality of stationary client computing devices to one or more secondary storage devices, the storage manager component and the one or more secondary storage devices remotely located from both the plurality of portable computing devices and the plurality of stationary client computing devices, wherein at least one of the data storage policies is associated with the plurality of portable client computing devices, the GUI allowing a user to specify:

a prerequisite network condition associated with the plurality of portable client computing devices;

a prerequisite power management condition associated with the plurality of portable client computing devices;

a minimum interval between secondary copy operations associated with the plurality of portable client computing devices; and a maximum interval between secondary copy operations associated with the plurality of portable client computing devices;

electronically transmitting from the storage manager component a data structure comprising the at least one of the data storage polices to a scheduling agent executing on each of the plurality of portable client computing devices;

for each of the plurality of portable client computing devices:

processing the data structure with the scheduling agent using computer hardware of one of the plurality of portable client computing devices to implement the data storage policy;

determining with the scheduling agent, a time between the minimum interval and the maximum interval that the prerequisite network condition is met, and the prerequisite power management condition is met;

delaying with the scheduling agent, initiation of performance of the secondary copy operation for a delay period;

when the prerequisite network condition and the prerequisite power management condition continue to be met after the delay period, sending a request from the scheduling agent to the storage manager to initiate performance of the secondary copy operation;

directing with the storage manager, the data agent executing on one of the plurality of portable client computing devices to initiate the secondary copy operation;

wherein the secondary copy operation copies a first set of data stored in the portable client computing device to the one or more secondary storage devices, and wherein the first set of data is associated with a first security threshold that is lower than a second security threshold associated with a second set of data; and wherein the secondary copy operation copies the second set of data with the second security threshold to the one or more secondary storage devices when the prerequisite network condition includes at least a wired network connection; and after the maximum interval has expired, initiating the performance of the secondary copy with the storage manager component regardless of whether the prerequisite network condition or prerequisite power management condition are met; and for the plurality of stationary client computing devices, performing a secondary copy operation based on the storage policies that copies the primary data from the plurality of stationary client computing devices to one or more secondary storage devices with the storage manager component.

2. The method of claim 1, further comprising:
upon determining that the prerequisite network condition or the prerequisite power management condition has ceased to be met, cancelling the performance of the secondary copy operation.

3. The method of claim 1, further comprising:
upon determining that the prerequisite network condition or the prerequisite power management condition has ceased to occur, suspending the performance of the secondary copy operation.

4. The method of claim 1, wherein the network condition comprises existence of either a wireless or a wired connection between the portable client computing device and the storage network.

5. The method of claim 1, wherein the power management condition comprises the existence of a connection of the portable device with an A/C power source.

6. The method of claim 1, wherein the GUI also allows a user to specify a CPU utilization threshold associated with the portable client computing device, and wherein the scheduling agent initiates the performance of the secondary copy operation when the prerequisite network condition is met, the prerequisite power management condition is met, and that a CPU utilization of the portable device is below the CPU utilization threshold.

7. The method of claim 1, wherein the GUI also allows a user to specify an available storage threshold associated with the portable client computing device, and wherein the step of initiating performance of the secondary copy operation is performed response to determining that the prerequisite network condition is met, the prerequisite power management condition is met, and an amount of available storage space associated with the portable client computing device is below the available storage threshold.

8. A system for scheduling secondary copy operations associated with a plurality of portable computing devices residing in a storage network including both the plurality of portable computing devices and a plurality of stationary computing devices, the system comprising:

a plurality of stationary computing devices and a plurality of portable computing devices comprising computer hardware and in communication over a storage network, the plurality of stationary computing devices and plurality of portable computing devices store primary data, the primary data generated by one or more applications executing in the plurality of stationary computing devices and the plurality of portable computing devices, wherein each of the plurality of portable computing devices includes a data agent and a scheduling agent, wherein each data agent that monitors the storage of the primary data, and wherein each scheduling agent implements a data storage policy;

a storage manager component in communication over the storage network with the plurality of portable computing devices and the plurality of stationary computing devices, the storage manager component comprising computer hardware configured to cause a graphical user interface (GUI) to be displayed to a user to configure data storage policies associated with performing secondary copy operations that copy the primary data from both the plurality of portable computing devices and the plurality of stationary computing devices to one or more secondary storage devices, the storage manager component and the one or more secondary storage devices remotely located from both the plurality of portable computing devices and the plurality of stationary computing devices, wherein at least one of the data storage policies is associated with the plurality of portable computing devices, the GUI allowing a user to specify:
  a prerequisite network condition associated with the plurality of portable computing devices;
  a prerequisite power management condition associated with the plurality of portable computing devices;
  a minimum interval between secondary copy operations associated with the plurality of portable computing devices; and
  a maximum interval between secondary copy operations associated with the plurality of portable computing devices, wherein the storage manager component is configured to transmit a data structure comprising at least one of the data storage polices over the storage network to the scheduling agent executing on each of the plurality of portable computing devices;

for each of the plurality of portable computing devices:
  the scheduling agent processes the data structure to implement the data storage policy;
  the scheduling agent determines at a time between the minimum interval and the maximum interval that the prerequisite network condition is met, and the prerequisite power management condition is met;
  the scheduling agent delays initiation of a performance of a secondary copy for a delay period;
  when the prerequisite network condition and the prerequisite power management condition continue to be met after the delay period, the scheduling agent sends a request to the remotely located storage manager to initiate the secondary copy operation;
  the storage manager directs the data agent executing on one of the plurality of portable client computing devices to initiate the secondary copy operation;
    wherein the secondary copy operation copies a first set of data stored in the portable computing device to the one or more secondary storage devices, wherein the first set of data is associated with a first security threshold that is lower than a second security threshold associated with a second set of data; and
    wherein the secondary copy operation copies the second set of data with the second security threshold to the one or more secondary storage devices when the prerequisite network condition includes at least a wired network connection;
  after the maximum interval has expired the storage manager initiates the performance of the secondary copy with the storage manager component regardless of whether the prerequisite network condition or prerequisite power management condition are met; and
  for the plurality of stationary computing devices, performing a secondary copy operation based on the storage policies that copies the primary data from the plurality of stationary computing devices to one or more secondary storage devices with the storage manager component.

9. The system of claim 8, wherein the scheduling agent is further configured to cancel the performance of the secondary copy operation upon a determination that the prerequisite network condition or the prerequisite power management condition has ceased to be met.

10. The system of claim 8, wherein the scheduling agent is further configured to suspend the performance of the secondary copy operation upon a determination that the prerequisite network condition or the prerequisite power management condition have ceased to be met.

11. The system of claim 8, wherein the network condition comprises existence of either a wireless or a wired connection between the portable device and the storage. network.

12. The system of claim 8, wherein the power management condition comprises the existence of a connection of the portable device with an A/C power source.

13. The system of claim 8, wherein the GUI also allows a user to specify a CPU utilization threshold associated with the portable device, and wherein portable device is further configured to initiate performance of the secondary copy operation in response to a determination that the prerequisite network condition is met, the prerequisite power management condition is met, and a CPU utilization of the portable device is below the CPU utilization threshold.

14. The system of claim 8, wherein the GUI also allows a user to specify an available storage threshold associated with the portable device, and wherein the scheduling agent is configured to initiate performance of the secondary copy operation in response to a determination that the prerequisite network condition is met, the prerequisite power management condition is met, and that an amount of available storage space associated with the portable device is below the available storage threshold.

* * * * *

UNITED STATES PATENT AND TRADEMARK OFFICE
CERTIFICATE OF CORRECTION

PATENT NO. : 8,977,672 B2  
APPLICATION NO. : 13/492445  
DATED : March 10, 2015  
INVENTOR(S) : Karandikar Page 1 of 1

It is certified that error appears in the above-identified patent and that said Letters Patent is hereby corrected as shown below:

In the specification

Column 1, line 14, change "the" to -- that --.

Column 1, line 66, change "an other" to -- another --.

Column 2, line 12, change "event the" to -- event on the --.

Column 2, line 35, change "pr" to -- preset --.

Column 4, line 34, change "can" to -- can present the system, or system administrator with a broad view --.

Column 4, line 53, change "rage" to -- storage --.

Column 5, line 12, change "the" to -- the association is stored as a static entity in an index, database --.

Column 5, line 38, change "agent" to -- agent 95 --.

Column 7, line 16, change "cells including" to -- cells 50 including --.

Column 7, line 40, change "in an" to -- in an example, an cache, a database, or other data structure --.

Column 8, line 19, change "for" to -- for locating the data stored or backed up. In some examples, --.

Column 9, line 14, change "form of" to -- form of a mobile or "smart phone" having enhanced --.

Column 10, line 53, change "agent" to -- agent 133 --.

Column 13, line 51, change "it then" to -- it then sends the request to start the job. The storage manager 100 --.

In the claims

Column 18, line 36, Claim 11, change "storage." to -- storage --.

Signed and Sealed this  
Twenty-third Day of February, 2016

Michelle K. Lee  
*Director of the United States Patent and Trademark Office*